C. H. WILLIAMS.
THIRD AND FOURTH POINT SUPPORT FOR BRAKE BEAMS.
APPLICATION FILED FEB. 14, 1917.
1,369,866.
Patented Mar. 1, 1921.
4 SHEETS—SHEET 1.
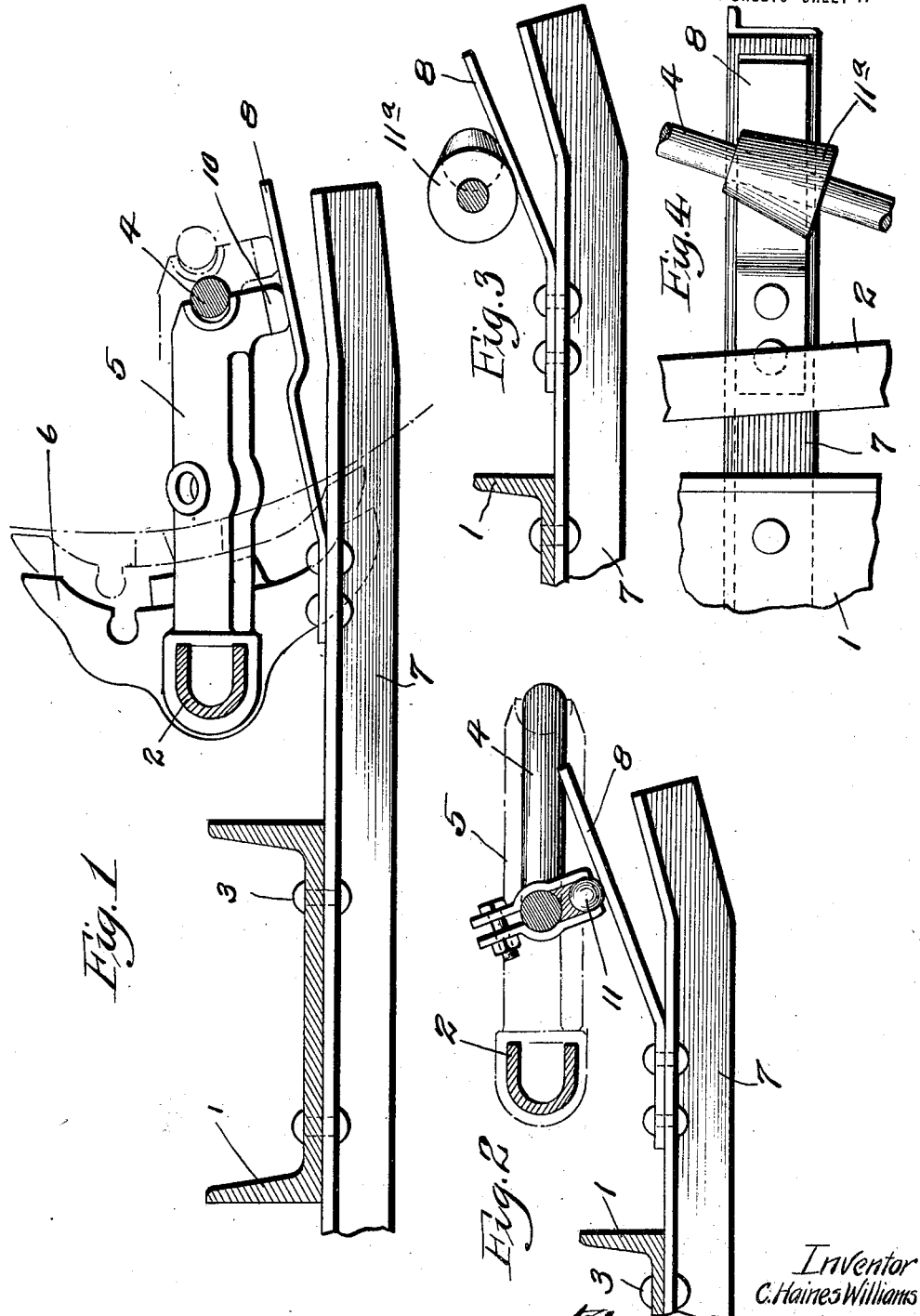
Inventor
C. Haines Williams C. H. WILLIAMS.
THIRD AND FOURTH POINT SUPPORT FOR BRAKE BEAMS.
APPLICATION FILED FEB. 14, 1917.
1,369,866.
Patented Mar. 1, 1921
4 SHEETS—SHEET 2.
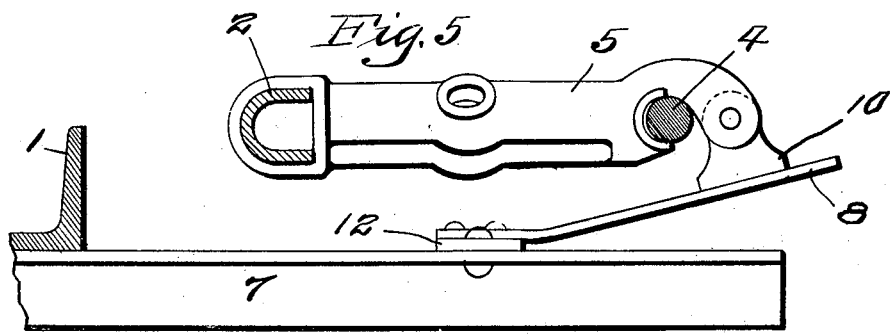
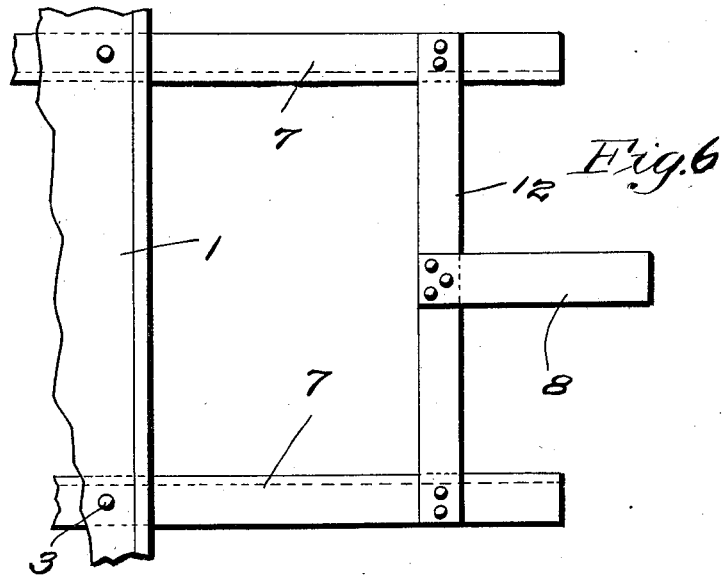
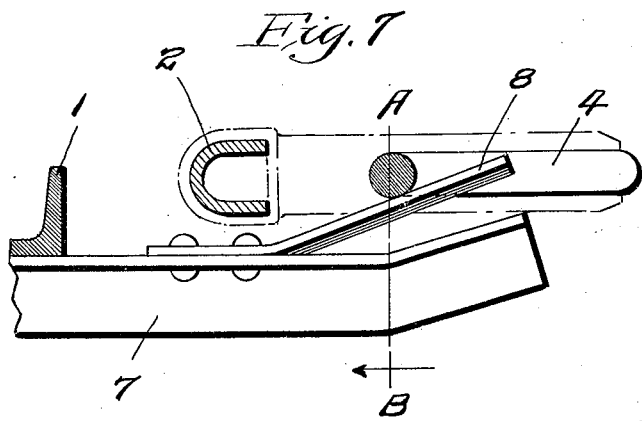
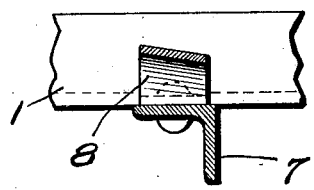
Inventor
C. Haines Williams
By J. R. Cornwall, Atty.

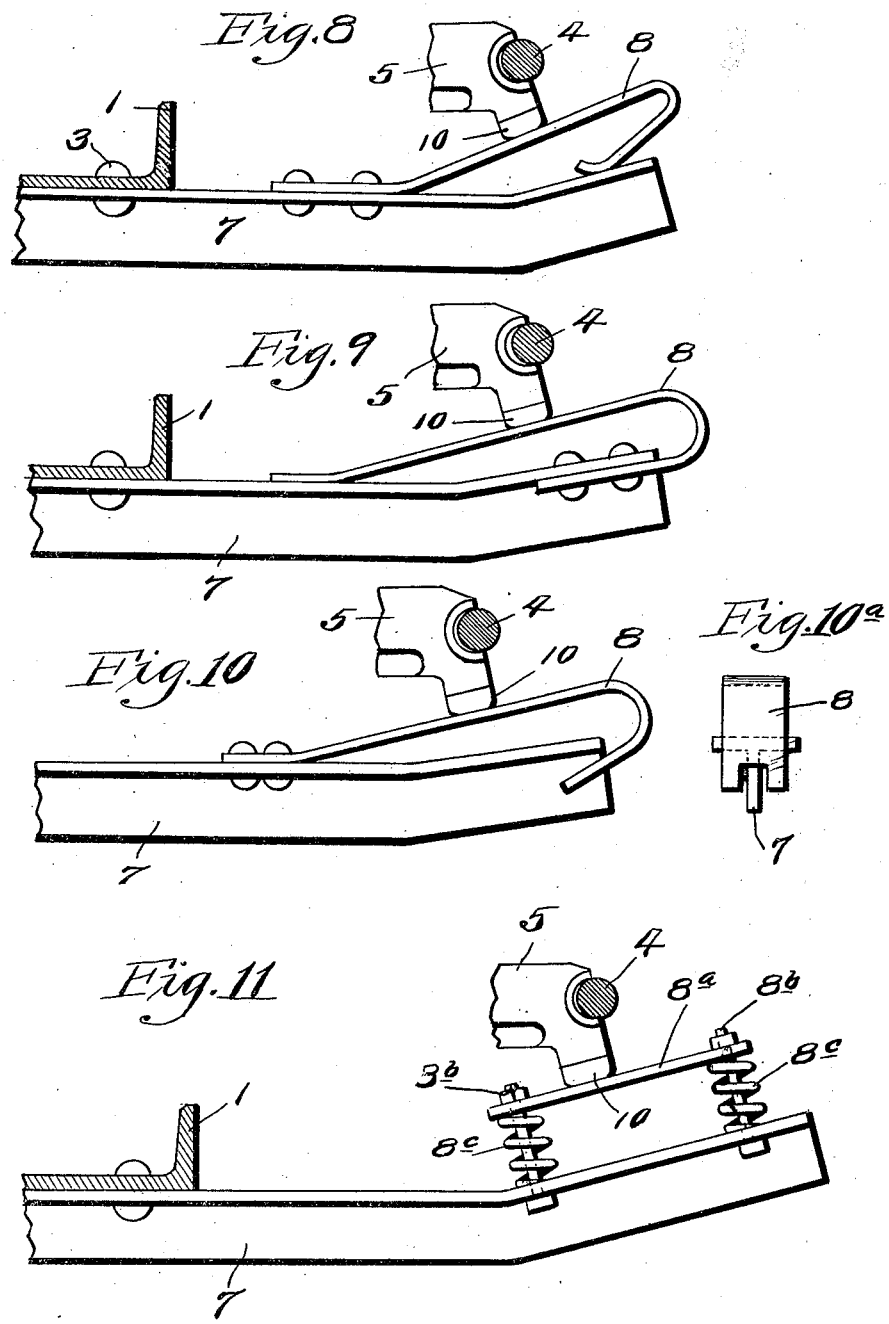

C. H. WILLIAMS.
THIRD AND FOURTH POINT SUPPORT FOR BRAKE BEAMS.
APPLICATION FILED FEB. 14, 1917.
1,369,866.
Patented Mar. 1, 1921.
4 SHEETS—SHEET 4.
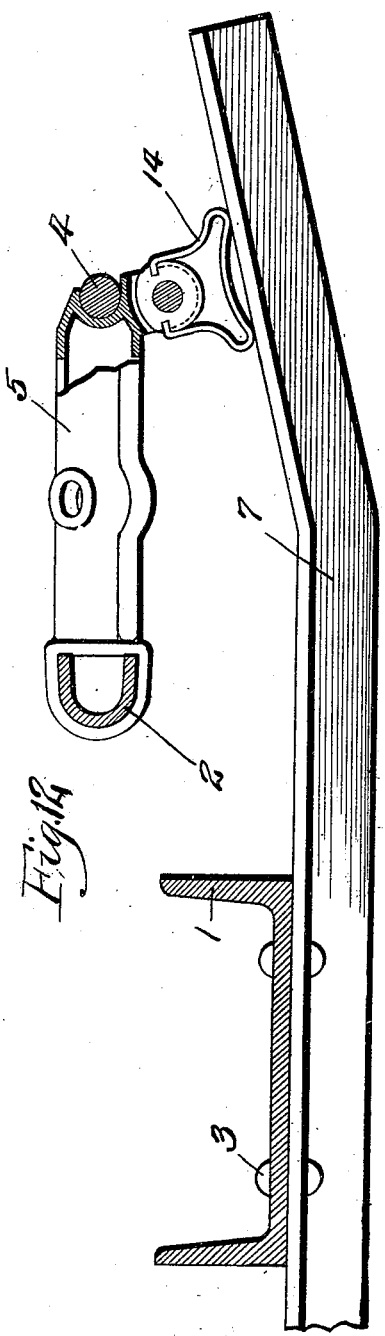
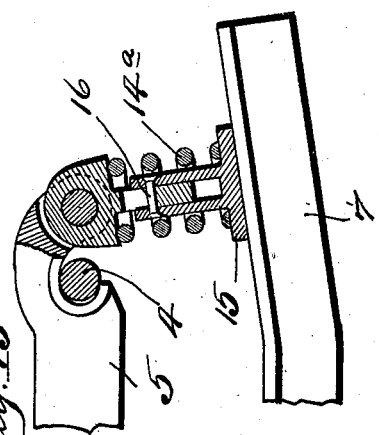
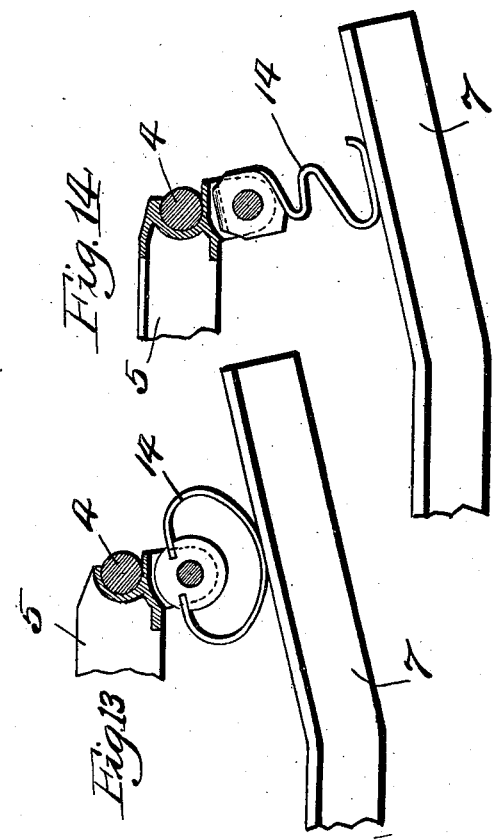
Inventor
C. Haines Williams
By J. T. Cornwall, Atty.

UNITED STATES PATENT OFFICE.

CHARLES HAINES WILLIAMS, OF CHICAGO, ILLINOIS, ASSIGNOR TO CHICAGO RAILWAY EQUIPMENT COMPANY, OF CHICAGO, ILLINOIS, A CORPORATION OF ILLINOIS.

THIRD AND FOURTH POINT SUPPORT FOR BRAKE-BEAMS.

1,369,866.

Specification of Letters Patent.

Patented Mar. 1, 1921.

Application filed February 14, 1917. Serial No. 148,551.

*To all whom it may concern:*

Be it known that I, CHARLES HAINES WILLIAMS, a citizen of the United States, residing at the city of Chicago, county of Cook, State of Illinois, have invented a certain new and useful Improvement in Third and Fourth Point Supports for Brake-Beams, of which the following is a full, clear, and exact description, such as will enable others skilled in the art to which it appertains to make and use the same, reference being had to the accompanying drawings, forming part of this specification.

This invention relates broadly to railway rolling stock, and specifically to certain improvements in the means for supporting the brake beam of the brake gear for the desired accurate coöperation with the wheels of the truck.

More specifically it relates to certain improvements in that portion of the truck equipment known as the third or fourth point brake beam support, and has as its principal object the provision of means whereby the brake beam may be securely retained against dropping to the track in case of detachment from its normal supporting means, and at the same time to afford the desired resilient supporting arrangement for guiding the brake beam at the proper elevations in the manipulation of the brakes.

In present practice, there is a well known construction wherein resilient spring members or trackways, affixed to the spring plank or other truck portion, extend outwardly therefrom below the brake beams and have their outer extremities inclined upwardly at the desired angle.

Portions of the brake beam equipment either carried on the strut or carried on the tension member, are designed to coöperate with these upwardly inclined outer portions of the resilient supporting members, having slidable engagement therewith, such as will permit the necessary movement of the brake beam in the application of the brakes to the wheels and the removal of the same.

My present invention improves upon this construction by affording not only the proper resilient guiding support, but also a stable and rigid member, which forms a safety device such as will catch and support the brake beam in case it becomes detached from its normal supporting means.

In the accompanying drawings, I have shown various forms in which my invention may be embodied to meet the requirements of different situations, and it will be understood that the embodiments shown are intended as simply illustrative, and that the invention may be incorporated into various other forms.

Figure 1 is a detail of the truck mechanism to which my invention relates, parts being in vertical section, the same showing the arrangement of my invention for a third point support;

Fig. 2 is a similar detail of another embodiment of my invention, the same being arranged as a fourth point support;

Fig. 3 is a similar detail of a modified form of the invention showing another arrangement for the fourth point support;

Fig. 4 is a detail of the form shown in Fig. 3, being a plan or top view thereof;

Fig. 5 is a detail partially in vertical section of a modified form arranged as a third point support;

Fig. 6 is a top or plan view of the supporting structure employed in the form illustrated in Fig. 5;

Fig. 7 is a detail partially in vertical section of a third form of fourth point support;

Fig. 7ª is a detail in the nature of a vertical section substantially on line A—B of Fig. 7;

Fig. 8 is a detail partly in vertical section of a third form of third point support;

Figs. 9, 10 and 11 are similar details showing respectively a fourth, fifth and sixth form of third point support;

Fig. 10ª is an end view of the form illustrated in Fig. 10;

Fig. 12 is a detail partly in vertical section illustrating a seventh form of third point support; while Figs. 13, 14, and 15 are details illustrative respectively of other forms of third point supports.

In all of these several illustrations, let it be understood that the reference character 1 indicates the spring plank of the truck; 2 the compression member of the brake beam; 4 the tension member of the brake beam; 5 the brake beam strut; and 6 the brake head. These are all conventional parts well known in the art.

In the embodiment illustrated in Fig. 1, the reference character 7 indicates what I will designate the safety support, and which is in the form of a rigid bar member of any convenient sectional form, which bar member is suitably affixed to the spring plank 1 by any appropriate attaching means 3. This bar member extends from the spring plank longitudinally of the truck below the brake beam, and its outer extremity may be slightly deflected upwardly, as illustrated, if desired. It is contemplated that this safety supporting member 7 shall be possessed of sufficient strength and rigidity to support the brake beam and the parts carried thereby, so as to hold the same against falling to the track in the event it becomes detached from other supporting means.

Secured to the safety supporting member 7 is a resilient guiding member 8, which is in the form of a strip of flat spring metal attached at one extremity to the member 7 and arranged so that its upper surface is at an inclination. Any desired form of third point support shoe 10 is carried by the strut member 5 in proper position for coöperation with the resilient guiding support 8, the arrangement being such that the outer extremity of the strut is supported upon and guided by the resilient guiding member 8 while having the necessary sliding movement thereon such as to permit the application and removal of the brakes. The inclination of the resilient supporting member 8, or more properly its near-radial position relative to the truck wheels, operates to guide the brake shoe so as to insure their making proper face contact with the wheels, while the resilient flexibility of the supporting member accommodates the movement of the beam incident to the setting of the brakes and assists in removal of the shoes from contact with the wheels when the brakes are released.

In the event of inadvertent detachment of the brake beam from its normal supporting means, the safety supporting member will carry it, thus preventing its dropping to the track, and the resulting derailment of the truck.

In the modification illustrated in Fig. 2, there are two of the safety supporting members 7, one supported on the spring plank at each side of the brake beam strut 5. Each of the safety supporting members 7 carries a resilient guiding member 8 which is disposed in proper position for coöperation with a fourth point supporting shoe 11 carried by the tension member 4 of the brake beam.

In the modification illustrated in Figs. 3 and 4, there is a similar arrangement of safety supporting members 7 and resilient guiding members 8, while the shoe 11ª is of conical form such as to compensate for the angular position of the tension member relative to the guiding members 8 and to provide a supporting contact throughout the width of the latter.

In the modification illustrated in Figs. 5 and 6, there are two of the safety supporting members 7, which are joined by a tie member 12, and upon which is supported the resilient guiding member 8 in position to coöperate with the shoe 10 carried by the strut 5.

In Figs. 7 and 7ª, which show a fourth point supporting arrangement, the resilient guiding members 8 are so arranged that their upper surfaces incline transversely of the truck or longitudinally of the brake beam, whereby to enable the tension member 4, in its angular position, to have supporting contact with them throughout their widths.

Figs. 8, 9, 10, and 11 show various fashions in which the resilient guiding member 8 may be supported on the safety supporting member 7. In Fig. 8, the outer extremity of the resilient guiding member is reversely turned and bears upon the upper surface of the member 7, thereby giving the guiding member additional support and resiliency. In Fig. 9 the resilient guiding member 8 is connected to the member 7 at its outer extremity, and has free bearing engagement with the member 7 at its inner extremity. In Figs. 10 and 10ª, the outer extremity of the guiding member 8 is reversely turned and deflected below the upper flange of the member 7 and notched to accommodate the lower flange of the latter member, whereby to give the member 8 additional security against deflection from its proper alinement. In Fig. 11 the resilient guiding member includes a strip $8^a$ which is slidably supported on bolts $8^b$ which extend upwardly from the member 7, said strip $8^a$ being afforded a resilient support by the springs $8^c$ which are held on the bolts $8^b$ between the strip and the member 7.

In Figs. 12, 13, 14 and 15, the embodiment of the invention is modified to the extent that the resilient guiding member which permits the desired flexible coöperation between the brake beam and the safety supporting member 7, is carried by a brake beam part instead of by the rigid safety supporting member. In these forms the upward inclination of the outer portion of the supporting member 7 gives the outer end of the strut the proper change in elevation during the operation of the brakes. In the form illustrated in Fig. 12, the resilient guiding member is designated by the numeral 14, and it is in the form of a spring foot carried by the strut and slidably supported upon the sloping outer portion of the safety supporting member 7. In this construction the resilient member 14 gives the necessary flexibility between the outer end of the strut and the rigid means which supports and guides it. In Fig. 13, the same arrangement is employed with the resilient member of a different form. In the form illustrated in Fig. 14, still another shape of the resilient member 14 is shown. In Fig. 15, the resilient member includes a wear shoe 15 which has sliding coöperation with the member 7 and which is resiliently supported from the strut by the slot and pin connection 16 and a spring 14ª.

From the foregoing, it will be observed that my invention resides in certain improvements whereby added strength and safety are secured while the necessary resilient guiding, supporting and operating functions are retained.

What I claim is:

1. In a truck, a safety device and third point support including the brake beam, a rigid bar member affixed to a truck portion and extending below the beam, and an interposed resilient member associated with the beam and the bar member to support the former upon the latter in movable relationship.

2. In a truck, a brake beam, a rigid bar member affixed to a truck part and extending beneath the beam, and an interposed elastic member associated with the beam and the bar member for supporting the former upon the latter for sliding movement longitudinally thereof.

3. In a truck, the combination of a brake beam, a rigid bar member affixed to a truck portion and extending below the beam and beyond its forward extremity and having sufficient strength to carry the same, and an interposed flexible member associated with the beam and the bar member to support the former upon the latter for movement longitudinally thereof and to and from the same.

4. In a truck, the combination of a brake beam, a rigid bar member affixed to a truck portion and extending below the brake beam and beyond the same in the direction of its operative movement, said bar member having strength sufficient to carry the beam, and a yielding pressure means interposed between the beam and the bar for supporting the former upon the latter to permit the beam to have movement toward the bar member against the influence of said means, and to permit the beam to have movement also longitudinally of the bar member.

5. In a truck, the combination of a brake beam, a rigid bar member affixed to a truck portion and extending transversely below and beyond the beam, said bar member having strength sufficient to carry the beam, and an interposed resilient member associated with the beam and with the bar member to provide a third or fourth point support for the former, said resilient member permitting movement of the beam toward the bar member and also longitudinally thereof.

6. In a truck, the combination of a brake beam, a rigid bar member affixed to a truck portion and extending transversely below the beam to afford a safety support in the event of detachment of the beam, and an interposed resilient member associated with the beam and the bar member to provide a third or fourth point support for the former upon the latter.

7. In a car truck, a brake beam, a rigid bar mounted to underlie said beam, and a resilient member engaging said bar and beam, said member being mounted for sliding movement relative to said bar, substantially as described.

8. In a car truck, a swinging brake beam, a rigid horizontal bar underlying said beam, and a resilient member having a bearing on said beam and bar and slidable relative to one thereof, substantially as described.

In testimony whereof I hereunto affix my signature in the presence of two witnesses, this 9th day of February, 1917.

CHARLES HAINES WILLIAMS.

Witnesses:
E. G. BUSSE,
E. T. WALKER.